United States Patent [19]

Takemura et al.

[11] Patent Number: 4,741,829

[45] Date of Patent: May 3, 1988

[54] COMPOSITE HOLLOW FIBERS AND METHOD OF MAKING SAME

[75] Inventors: Tohru Takemura, Ohtake; Haruhiko Yoshida, Kugagun; Osamu Hukunaga, Iwakuni, all of Japan

[73] Assignee: Mitsubishi Rayon Co., Ltd., Tokyo, Japan

[21] Appl. No.: 783,931

[22] PCT Filed: Jun. 27, 1985

[86] PCT No.: PCT/JP85/00362

§ 371 Date: Sep. 30, 1985

§ 102(e) Date: Sep. 30, 1985

[87] PCT Pub. No.: WO87/00213

PCT Pub. Date: Jan. 15, 1987

[51] Int. Cl.$^4$ .............................................. B01D 13/00
[52] U.S. Cl. ........................ 210/500.23; 210/500.36; 264/173
[58] Field of Search .................. 264/173, 185, 209.5; 210/490, 500.23, 500.36

[56] References Cited

U.S. PATENT DOCUMENTS

| | | | |
|---|---|---|---|
| 4,164,437 | 8/1979 | Henne et al. | 264/173 X |
| 4,385,094 | 5/1983 | Tahaka et al. | 264/185 X |
| 4,401,567 | 8/1983 | Shindo et al. | 210/500.23 X |
| 4,444,710 | 4/1984 | Most, Jr. | 264/209.5 |

FOREIGN PATENT DOCUMENTS

| | | | |
|---|---|---|---|
| 0010282 | 1/1979 | Japan | 210/500.23 |
| 54-42424 | 4/1979 | Japan . | |
| 55-107507 | 8/1980 | Japan . | |
| 55-155704 | 12/1980 | Japan . | |
| 56-152704 | 11/1981 | Japan . | |
| 57-66114 | 4/1982 | Japan . | |
| 60-7853 | 1/1985 | Japan . | |

*Primary Examiner*—Frank Spear
*Attorney, Agent, or Firm*—Oblon, Fisher, Spivak, McClelland & Maier

[57] ABSTRACT

The present invention provides a novel composite porous hollow fiber comprising at least two layers joined to each other, characterized in that the layers consist of thermoplastic organic polymers of different types or of the same type and have micropores of different sizes, the micropores of these layers are interconnected to form contiguous micropores extending from the external surface to the internal surface of the hollow fiber, and the layer having larger micropores is thicker than the layer having smaller micropores, as well as a method of making such a hollow fiber, which method comprises melt-spinning a hollow fiber by feeding polymers of different types or of the same type through a nozzle having two or more concentrically disposed annular orifices, then stretching the hollow fiber, and subsequently heat setting the stretched hollow fiber.

The composite hollow fiber gives higher permeation rates for permeative substances, as compared with prior art hollow fibers. Moreover, this composite hollow fiber makes it possible to ameliorate its chemical and physical interaction with certain substances while retaining its desired fractionation capability.

15 Claims, No Drawings

COMPOSITE HOLLOW FIBERS AND METHOD OF MAKING SAME

DESCRIPTION

1. Technical Field

This invention relates to porous hollow fibers consisting of thermoplastic organic polymers and a method of making the same. More particularly, it relates to novel porous hollow fibers suitable for use in the separation of various substances which fibers are composed of at least two layers consisting of thermoplastic organic polymers of different types or of the same type and having micropores of different sizes and which fibers have a microstructure comprising micropores interconnected within each of the layers and between the layers, as well as a method of making the same.

2. Background Art

It is already known that porous hollow fibers can be produced by using, as base polymers, polypropylene and polyethylene which are typical thermoplastic organic polymers.

U.S. Pat. No. 4,055,696 discloses porous hollow filaments consisting essentially of polypropylene and having fine holes whose radii are distributed over a range of 200 to 1200 Å. It is described therein that these hollow filaments have a wall thickness of 17.5–22.5 μm and a gas permeability of $1.4$–$6.7 \times 10^{-6}$ (cc·cm/cm$^2$·sec·cmHg).

U.S. Pat. No. 4,401,567 discloses porous hollow fibers consisting of polyethylene. It is described therein that these hollow fibers have a wall thickness of 50–60 μm, an N$_2$ gas permeability of $4.9$–$7.2 \times 10^5$ (l/m$^2$·hr·760 mmHg), a water permeability of 1900–3200 (ml/m$^2$·hr·mmHg) and an albumin permeability of 100%.

Furthermore, it is disclosed in U.S. Pat. No. 3,423,491 that there can be produced polyethylene hollow fibers exhibiting a salt rejection value of not less than 75% and having pores suitable for use in reverse osmosis, and it is disclosed in U.S. Pat. No. 4,020,230 that there can be produced porous polyethylene hollow fibers having a maximum pore radius of up to about 50 Å and capable of rejecting about 95% or more of albumin molecules with a radius of gyration of approximately 30 Å.

However, all of these prior patents are concerned with hollow fibers having micropores whose size distribution is uniform. The hollow fibers disclosed in these prior patents have the function of separating substances and, as regards their mechanism, they allow or prevent the passage of certain substances on the basis of the difference between the size of micropores and the geometry of molecules of substances to be separated. From an industrial point of view, it is also important to increase the permeation rates of substances to be permeated in the separation process as much as possible. In the hollow fiber according the aforesaid prior patents, however, the size of micropores must be restricted if it is desired to separate certain substances. Especially where it is desired to separate substances whose molecular sizes are small, the size of micropores must be reduced on the whole. This decreases the effective cross-sectional area of the flow paths through which the substance is transferred, resulting in a reduced permeation rate of the substance to be transferred.

Moreover, in the art of separating substances, the chemical and physical interaction between the material constituting the separating membrane and the substances to be separated is also an important factor. However, the hollow fibers disclosed in the above-described prior patents consist of a single material and it is difficult to meet all the performance and functional requirements for a separating membrane by use of a single material (e.g., a single polymer having a fixed MI value).

Furthermore, in recent years, such porous hollow fibers are being utilized as materials for the manufacture of artificial organs such as artificial kidneys, plasma exchangers and the like, but some materials involve the problem of incompatibility with blood, i.e., the property of causing blood coagulation, hemolysis or the like. Although the mechanisms of blood coagulation, hemolysis and the like have not been adequately elucidated, the interaction between a material and blood is considered to be one of the factors governing its compatibility with blood. Presently known materials having good compatibility with blood include, for example, silicone resins, polyurethanes, and ethylene-vinyl acetate copolymer hydrolyzates. However, there has not yet been developed a method for melt-spinning such a material to form hollow fibers having practically adequate permeability, i.e., giving sufficiently high permeation rates for permeative substances.

DISCLOSURE OF THE INVENTION

It is an object of the present invention to provide porous hollow fibers in which the part having very fine pores is formed as an extremely thin layer and which, as a whole, have high mass transfer rates and hence sufficient permeability in practice.

It is another object of the present invention to provide porous hollow fibers having a novel structure which includes an extremely thin layer having very fine pores and can be produced industrially, and a method of making such porous hollow fibers.

It is still another object of the present invention to provide porous hollow fibers which have desired fractionation capability and are improved so as to lessen their chemical and physical interaction with certain substances.

According to the present invention, there is provided a melt-spun and stretched composite hollow fiber comprising at least two layers joined to each other, characterized in that the layers consist of thermoplastic organic polymers of different types or of the same type and have micropores of different sizes, the micropores are interconnected within each of the layers or between the layers to form contiguous micropores extending from the external surface to the internal surface of the hollow fiber, and the layer having larger micropores is thicker than the layer having smaller micropores. Preferably, this composite hollow fiber is further characterized in that the internal diameter of the hollow fiber is from 50 to 5000 μm, the combined thickness of the layers if from 5 to 500 μm, and the rate of air permeation from the inside to the outside of the hollow fiber is not less than 100 liters/m$^2$·hr·0.5 atm.

According to the present invention, there is also provided a method of making a composite hollow fiber which comprises melt-spinning a hollow fiber composed of at least two layers consisting of polymers of different types or of the same type and having different thicknesses, by using a hollow fiber-forming nozzle having two or more concentrically disposed annular orifices and feeding said polymers to said orifices separately; immediately after that or after annealing said hollow fiber, stretching said hollow fiber to produce a multiplicity of micropores in each of said layers so that the thicker layer has larger micropores and the thinner layer has smaller micropores; and subsequently heat-setting the stretched hollow fiber.

BEST MODE FOR CARRYING OUT THE INVENTION

The thermoplastic organic polymers which can be used in the present invention include, for example, polyethylene, polypropylene, poly-3-methylbutene-1, poly-4-methylpentene-1, polyvinylidene fluoride, polyethylene terephthalate, polytetramethylene terephthalate, polyhexamethylene adipate, polycaprolactam, polyoxymethylene, crystalline copolymers composed chiefly of these homopolymers, and combinations of the foregoing polymers, as well as combinations of one or more of the foregoing polymers and one or more polymers selected from silicone resins, polyurethanes, ethylene-vinyl acetate copolymers or their hydrolyzates, ethylene-vinyl alcohol copolymers, and ethylene-vinyl chloride copolymers. However, the types of polymers used should be properly selected according to the primary function which the resulting composite hollow fibers are intended to perform. For example, in the case of composite hollow fibers composed of two layers consisting of different polymers in which the inner layer comprises a thin layer having smaller micropores and the outer layer comprises a thick layer having larger micropores, it is preferable to employ polypropylene or polyethylene having a relatively low melt index (MI value) as the material of the inner layer and polyethylene having a relatively high MI value as the material of the outer layer. Similarly, in the case of composite hollow fibers composed of two layers in which the inner layer comprises a thin layer having good biological compatibility and the outer layer comprises a thick layer having large micropores, it is preferable to employ an ethylene-vinyl alcohol copolymer as the material of the inner layer and polyethylene as the material of the outer layer. Where polymers of the same type are used, it is preferable to employ polymers having different MI polymers. However, polymers of the same type having an identical MI value may also be used, for example, by incorporating a nucleating agent into only the polymer constituting one of the layers.

As a means for making a separating membrane thinner and thereby improving its permeability and hence its separation efficiency, asymmetric membranes comprising a dense layer and a porous layer are being commercially produced in the form of RO membranes or ultrafiltration membranes. These asymmetric membranes are formed according to the wet process for forming a membrane from a polymer solution in which the superficial part is solidified densely and the inner part is made porous by selection of proper solidifying conditions or use of a leaching technique. Thus, these hollow fibers consist of a single material and their membrane structure is determined by controlling the solidifying conditions.

Accordingly, the structure of the micropores of a membrane formed by this process changes continuously from the superficial dense part to the internal porous part and includes an intermediate structural portion which only increases permeation resistance without performing any separating function. This is not desirable from the viewpoint of the filtering efficiency of hollow fibers.

For that reason, the hollow fibers of the present invention are formed in such a way that the layer having larger micropores is thicker than the layer having smaller micropores. If the layer having smaller micropores is thicker, the effects of the present invention cannot be fully achieved because of an increase in permeation resistance. Where the composite hollow fibers of the present invention consist of three or more layers, it is not preferable that the micropores of adjoining layers have gradually changing sizes. For example, the layers should preferably be arranged in such a way that the innermost and outermost layers have larger micropores and the intermediate layer has smaller micropores.

The MI values of the thermoplastic polymers used in the present invention should preferably be such that the MI value of the polymer constituting the thicker layer ranges from 0.1 to 50 and more preferably from 1 to 15. The MI values given herein were measured according to ASTM D-1238. This range of MI values is especially suitable for the purpose of stably producing composite hollow fibers having at least two layers according to the present invention. If the MI value is less than 0.1, the melt viscosity is so high that it is difficult to effect stable spinning. On the other hand, if the MI value is greater than 50, the melt viscosity is so low that it is also difficult to effect stable spinning.

In the practice of the present invention, the above-defined thermoplastic organic polymers are melt-spun through a hollow fiber-forming nozzle to produce a composite hollow fiber composed of at least two layers having micropores of different sizes in which the micropores are interconnected within each of the layers and between the layers so as to be contiguous from one surface of the hollow fiber to the other and the layer having larger micropores is thicker than the layer having smaller micropores. The nozzle used for melt spinning purposes should desirably have two or more concentrically disposed annular orifices.

In order to stably produce a composite hollow fiber composed of at least two layers having micropores of different sizes in which the micropores are interconnected within each of the layers and between the layers, it is desirable to employ a spinning temperature which, with respect to each of the polymers being fed, ranges from the melting point of the polymer to a temperature higher than the melting point by about 80° C. If the spinning temperature is higher than a temperature higher than the melting point of each high polymer by more than 80° C., the melt viscosity is so low that it is difficult to effect stable spinning.

In order to stably produce the composite hollow fiber of the present invention, it is preferable to employ a spinning draft ratio exceeding 30. If the spinning is carried out with a spinning draw ratio of less than 30, the melt-spun hollow fiber has a low degree of orientation and may fail to give an elongation sufficient to achieve a predetermined amount of stretch in a subsequent stretching step. As a result, it is difficult to form micropores of required size in each layer.

The stretching should preferably be carried out by a two-stage process comprising cold stretching followed by hot stretching, or by a multi-stage process comprising cold stretching and hot stretching which is further divided into a plurality of stages. The cold stretching is the step of causing structural destruction at relatively low temperatures and thereby creating microcrazes in the polymers, and it is preferable to carry out the cold stretching at a relatively low temperature ranging from 0° C. to a temperature lower than the melting points of the polymers by 50° C. The cold stretching is especially effective in making porous layers consisting of crystalline organic polymers, among the above-enumerated thermoplastic organic polymers. The hot stretching is the step of expanding the microcrazes created by the cold stretching and thereby forming micropores. Although it is preferable to carry out the hot stretching at relatively high temperatures, the melting points of the polymers should not be exceeded. As used herein, the term "fiber elongation" is defined as the value obtained by subtracting the unstretched fiber length (original fiber length) from the stretched fiber length. Although the fiber elongation may vary according to the desired size of micropores, the stretching should preferably be carried out in such a way that the fiber elongation is 0.1 to 8 times as large as the original fiber length. In the present invention, the formation of micropores is achieved by stretching, so that physical elastic recovery power remains in the stretched hollow fiber and may degrade the physical dimensional stability of the product. Heat setting is a step required to overcome this difficulty and should preferably be carried out by treating the stretched hollow fiber at elevated temperatures while maintaining the final fiber elongation resulting from the hot stretching step or while relaxing the hollow fiber by 80% or less of the fiber elongation. In order to achieve effective heat setting, it is preferable to employ a temperature higher than the stretching temperature.

In order to form larger pores in the thicker layer of the hollow fiber and smaller pores in the thinner layer, a proper combination of MI values, crystal-forming properties (microcrystal-forming properties) and other properties of the polymers should be selected so that the thicker layer consists of a polymer which more easily forms large pores under the influence of a give degree of stretching.

The composite porous hollow fibers produced according to the present invention comprise two or more layers having micropores of different sizes and, therefore, have a number of remarkable advantages as described hereinbelow.

First, as the pore size becomes smaller, the effective cross-sectional area of flow path and hence the mass transfer rate is reduced. However, if the layer having fine pores is made thinner, the flow path length is shortened and, as a result, the mass transfer rate is enhanced.

Second, where it is desired to separate a substance whose molecular size is very small, one of the two or more layers may be formed so as to have a sufficiently small pore size and a sufficiently small thickness, depending on the molecular size. Thus, there can be obtained a membrane which permits a substance having a very small molecular size to be separated without reducing its mass transfer rate.

Third, it is very difficult to produce thin membranes industrially. However, if a composite hollow fiber is produced as taught by the present invention, a very thin layer having small micropores can be formed by using a relatively thick layer having larger micropores as a substrate. Thus, there can be produced porous hollow fibers which, as a whole, have an industrially practicable order of thickness.

Fourth, some materials exhibit biological incompatibility such as incompatibility with blood, i.e., the property of causing blood coagulation, hemolysis or the like, although they permit industrial production of porous hollow fibers having desired fractionation capability and productivity. The biological compatibility of porous hollow fibers consisting of such materials can be improved by providing a layer consisting of a biologically compatible material on that side of the porous hollow fibers which comes into contact with blood.

The present invention is further illustrated by the following examples.

EXAMPLE 1

High-density polyethylene having a density of 0.968 and an MI value of 5.5 and polypropylene having a density of 0.910 and an MI value of 15 were spun by using a hollow fiber-forming nozzle having two concentrically disposed annular orifices. The high-density polyethylene was extruded through the outer orifice at an extrusion temperature of 200° C. and an extrusion line speed of 8.43 cm/min, while the polypropylene was extruded through the inner orifice at an extrusion temperature of 200° C. and an extrusion line speed of 6.56 cm/min. The hollow fiber so formed was taken up at a take-up speed of 200 m/min with spinning draw ratio of 2370 for the polyethylene and 3049 for the polypropylene.

The unstretched hollow fiber thus obtained had an internal diameter of 507 $\mu$m, a polypropylene layer thickness of 20 $\mu$m and a polyethylene layer thickness of 59 $\mu$m. This unstretched hollow fiber was passed over a roller heated at 115° C. under constant-length conditions to bring the hollow fiber into contact with the roller for 140 seconds and thereby effect its annealing. Further, the annealed hollow fiber was cold-stretched at a stretch ratio of 40% by rollers kept at 20° C., hot-stretched by rollers in a box heated at 115° C. until a total stretch ratio of 260% was achieved, and then heat-set in a box heated at 115° C. while being relaxed by 25% of the total elongation to obtain a composite hollow fiber. The hollow fiber thus obtained had an internal diameter of 360 $\mu$m, a polypropylene layer thickness of 12 $\mu$m and a polyethylene layer thickness of 45 $\mu$m. Electron microscopic observation revealed that the pore size of the polyethylene layer was larger than that of the polypropylene layer. This composite hollow fiber had an air flux of 20,000 liters/m$^2$·hr·0.5 kg/cm$^2$ (20° C.).

COMPARATIVE EXAMPLE 1

Using a hollow fiber-forming nozzle having a single annular orifice, polypropylene (OBF-Polypro 115G, a product of Ube Industries, Ltd.) having a density of 0.910 and an MI value of 15 was spun at an extrusion temperature of 200° C. and an extrusion line speed of 8.12 cm/min. The hollow fiber so formed was taken up at a take-up speed of 200 m/min with a spinning draw ratio of 2463.

The unstretched hollow fiber thus obtained had an internal diameter of 561 $\mu$m and a membrane thickness of 81 $\mu$m. This unstretched hollow fiber was passed over a roller heated at 115° C. under constant-length conditions to bring the hollow fiber into contact with the roller for 140 seconds and thereby effect its annealing. Further, the annealed hollow fiber was cold-stretched at a stretch ratio of 40% by rollers kept at 20° C., hot-stretched by rollers in a box heated at 115° C. until a total stretch ratio of 260% was achieved, and then heat-set in a box heated at 115° C. while being relaxed by 25% of the total elongation to obtain a composite hollow fiber.

The hollow fiber thus obtained had an internal diameter of 318 μm and a membrane thickness of 52 μm. The size of the micropores of this hollow fiber was substantially the same as that of the micropores of the polypropylene layer in Example 1. This hollow fiber had an air flux of 3000 liters/m$^2$·hr·0.5 kg/cm2 (20° C.).

EXAMPLE 2

Poly-4-methylpentene-1 having a density of 0.835 and an MI value of 70 and polypropylene having a density of 0.910 and an MI value of 15 were spun by using a hollow fiber-forming nozzle having two concentrically disposed annular orifices. The poly-4-methylpentene-1 was extruded through the inner orifice at an extrusion temperature of 255° C. and an extrusion line speed of 5 cm/min, while the polypropylene was extruded through the outer orifice at an extrusion temperature of 255° C. and an extrusion line speed of 5 cm/min. The hollow fiber so formed was taken up at a take-up speed of 200 m/min with a spinning draw ratio of 4000.

The unstretched hollow fiber thus obtained had an internal diameter of 130 μm, a poly-4-methylpentene-1 layer thickness of 9 μm and a polypropylene layer thickness of 20 μm. This unstretched hollow fiber was passed over a roller heated at 140° C. under constant-length conditions to bring the hollow fiber into contact with the roller for 140 seconds and thereby effect its annealing. Further, the annealed hollow fiber was cold-stretched at a stretch ratio of 30% by rollers kept at 30° C., hot-stretched by rollers in a box heated at 135° C. until a total stretch ratio of 280% was achieved, and then heat-set in a box heated a 140° C. while being relaxed by 25% of the total elongation to obtain a composite hollow fiber. The hollow fiber thus obtained had an internal diameter of 120 μm. Electron microscopic observation revealed that the pore size of the polypropylene layer was larger than that of the poly-4-methylpentene-1 layer. Specifically, the pores of the poly-4-methylpentene-1 layer were 0.03–0.035 μm long and 0.015–0.018 μm wide, while the pores of the polypropylene layer were 0.2–0.22 μm long and 0.1–0.13 μm wide. This composite hollow fiber had an air flux of 500 liters/m$^2$·hr·0.5 kg/cm$^2$ (20° C.).

EXAMPLE 3

Polyethylene having a density of 0.959 and an MI value of 0.8 and polyethylene having a density of 0.968 and an MI value of 5.5 were spun by using a hollow fiber-forming nozzle having two concentrically disposed annular orifices. The low-MI polyethylene was extruded through the inner orifice at an extrusion temperature of 190° C. and an extrusion line speed of 6.7 cm/min, while the high-MI polyethylene was extruded through the outer orifice at an extrusion temperature of 190° C. and an extrusion line speed of 6.7 cm/min. The hollow fiber so formed was taken up at a take-up speed of 200 m/min with a spinning draw ratio of 4500.

The unstretched hollow fiber thus obtained had an internal diameter of 380 μm, a low-MI polyethylene layer thickness of 7 μm and a high-MI polyethylene layer thickness of 38 μm. This unstretched hollow fiber was passed over a roller heated at 115° C. under constant-length conditions to bring the hollow fiber into contact with the roller for 140 seconds and thereby effect its annealing. Further, the annealed hollow fiber was cold-stretched at a stretch ratio of 50% by rollers kept at 30° C., hot-stretched by rollers in a box heated at 105° C. until a total stretch ratio of 320% was achieved, and then heat-set in a box heated at 115° C. while being relaxed by 25% of the total elongation to obtain a composite hollow fiber. The hollow fiber thus obtained had an internal diameter of 350 μm. Electron microscopic observation revealed that the pore size of the high-MI polyethylene layer was larger than that of the low-MI polyethylene layer. Specifically, the pores of the high-MI polyethylene layer were 1.0–1.3 μm long and 0.15–0.18 μm wide, while the pores of the low-MI polyethylene layer were 0.18–0.202 μm long and 0.075–0.09 μm wide. This composite hollow fiber had an air flux of 120,000 liters/m$^2$·hr·0.5 kg/cm$^2$ (20° C.).

EXAMPLE 4

Polyethylene having a density of 0.959 and an MI value of 0.8, polyethylene having a density of 0.965 and an MI value of 14, and polyethylene having a density of 0.968 and an MI value of 5.5 were spun by using a hollow fiber-forming nozzle having three concentrically disposed annular orifices. The middle-MI polyethylene was extruded through the inner orifice at an extrusion temperature of 190° C. and an extrusion line speed of 6.7 cm/min, the low-MI polyeethylene was extruded through the middle orifice at an extrusion temperature of 190° C. and an extrusion line speed of 6.7 cm/min, and the high MI polyethylene was extruded through the outer orifice at an extrusion temperature of 190° C. and an extrusion line speed of 6.7 cm/min. The hollow fiber so formed was taken up at a take-up speed of 200 m/min with a spinning draw ratio of 4500.

The unstretched hollow fiber thus obtained had an internal diameter of 350 μm, a middle-MI polyethylene layer thickness of 11 μm, a low-MI polyethylene layer thickness of 7 μm and a high-MI polyethylene layer thickness of 30 μm. This unstretched hollow fiber was passed over a roller heated at 115° C. under constant-length conditions to bring the hollow fiber into contact with the roller for 140 seconds and thereby effect its annealing. Further, the annealed hollow fiber was cold-stretched at a stretch ratio of 50% by rollers kept at 30° C., hot-stretched by rollers in a box heated at 105° C. until a total stretch ratio of 320% was achieved, and then heat-set in a box heated at 115° C. while being relaxed by 25% of the total elongation to obtain a composite hollow fiber. The hollow fiber thus obtained had an internal diameter of 320 μm. Electron microscopic observation revealed that the pore size of the high-melt index polyethylene layer was the largest and the pore size of the low MI polyethylene layer was the smallest. Specifically, the pores of the inner layer were 1.0–1.3 μm long and 0.15–0.18 μm wide, the pores of the middle layer were 0.18–0.20 μm long and 0.075–0.09 μm wide, and the pores of the outer layer were 4.4–5.0 μm long and 0.48–0.52 μm wide. This composite hollow fiber had an air flux of 109,000 liters/m$^2$·hr·0.5 kg/cm$^2$ (20° C.).

We claim:

1. A method of making a composite hollow fiber, which comprises:
   melt-spinning a hollow fiber composed of at least two layer consisting of different thermoplastic polymers or the same type of thermoplastic organic polymers having different MI values and having different thicknesses, through a hollow fiber-forming nozzle having at least two concentrically disposed annualr orifices, wherein said polymers are separately fed through said orifices;

immediately stretching said hollow fiber to produce a multiplicity of micropores in each of said layers so that the thicker has larger micropores than the thinner layer; and subsequently heat-setting the stretched hollow fiber.

2. The method of making a composite hollow fiber as claimed in claim 1 wherein at least the high polymer constituting said thicker layer has a melt index of 0.1 to 50 at the time of its spinning.

3. A method of making a composite hollow fiber as claimed in claim 1 wherein, with respect to each of the polymers being fed, said melt spinning is carried out at a spinning temperature ranging from the melting point of the polymer to a temperature higher than said melting point by about 80° C.

4. A method of making a composite hollow fiber as claimed in claim 1 wherein said melt spinning is carried out with a spinning draw ratio of 30 or greater.

5. A method of making a composite hollow fiber as claimed in claim 1 wherein said stretching is carried out in a plurality of stages.

6. The method of making a composite hollow fiber as claimed in claim 5 wherein the first stage of said multi-stage stretching is carried out at a stretching temperature ranging from 0° C. to a temperature lower than the melting points by 50° C.

7. The method of making a composite hollow fiber as claimed in claim 1 wherein said stretching is carried out in such a way that the ratio of fiber elongation to original fiber length ranges from 0.1 to 8.

8. The method of making a composite hollow fiber as claimed in claim 1 wherein said heat setting is carried out under constant-length conditions.

9. The method of making a composite hollow fiber as claimed in claim 1 wherein said heat setting is carried out while said hollow fiber is relaxed by 80% or less of the fiber elongation.

10. The method of making a composite hollow fiber as claimed in claim 1 wherein said heat setting is carried out at a temperature equal to or higher than the stretching temperature.

11. The method of claim 1, which process further comprises, before stretching said hollow fiber, annealing the hollow fiber which hs been melt-spun.

12. A melt-spun and stretched composite hollow fiber comprising at least two layers joined to each other said layer consisting of different thermoplastic organic polymers or the same type of thermoplastic organic polymer having different MI values and having micropores of different sizes, said micropores being internconnected within each of said layers or between siad layers to form contiguous micropores extending from the external surface of said hollow fiber to its internal surface, with the layer having larger micropores being thicker than the layer having smaller micropores.

13. The composite hollow fiber of claim 12, wherein the internal diameter of said hollow fiber ranges from 50 to 5000 $\mu$m, the combined thickness of said layers ranges from 5 to 500 $\mu$m, and the rate of air premeation from the inside to the outside of said hollow fiber is not less than 100 liters/$m^2 \cdot hr \cdot 0.5$ atm.

14. The composite hollow fiber of claim 12, wherein said thermoplastic organic polymers are selected from the group consisting of polyethylene, polyporpylene, poly-3-methylbutene-1, poly-4-methylpentene-1, polyvinylidene fluroide, polyethylene terephthalate, polytetramethylene terephthalate, polyhexamethylene adipate, polycarprolactam, polyoxymethyleen, crystalline copolymers composed chiefly of these homopolymers, and combinations thereof.

15. The composite hollow fiber of claim 14, wherein the thermoplastic organic polymers of said two layers are combinations of at least one of the polymer materials of claim 14 in combination with at least one polymer selected from the group consisting of silicone resins, polyurethanes, ethylene-vinyl acetate coppolymers, hydrolyzates of said ethylene-vinyl acetate copolymers, ethylene-vinyl alcohol copolymers and ethylene-vinyl chloride copolymers.

* * * * *